United States Patent [19]

Gualtieri et al.

[11] Patent Number: 4,728,178

[45] Date of Patent: Mar. 1, 1988

[54] FACETED MAGNETO-OPTICAL GARNET LAYER AND LIGHT MODULATOR USING THE SAME

[75] Inventors: Devlin M. Gualtieri, Ledgewood; Paul F. Tumelty, Morristown, both of N.J.

[73] Assignee: Allied Corporation, Morris Township, Morris County, N.J.

[21] Appl. No.: 832,276

[22] Filed: Feb. 20, 1986

Related U.S. Application Data

[63] Continuation-in-part of Ser. No. 627,013, Jul. 2, 1984, abandoned.

[51] Int. Cl.⁴ .......................... G02F 1/09; G11B 7/24
[52] U.S. Cl. .................................. 350/377; 427/128; 428/692; 428/700; 428/900
[58] Field of Search ................. 428/692, 700, 900; 252/62.57; 350/376, 377; 365/2, 3, 33; 427/128

[56] References Cited

U.S. PATENT DOCUMENTS

| | | | |
|---|---|---|---|
| 3,701,127 | 10/1972 | Bobeck et al. | 340/174 TF |
| 3,989,352 | 11/1976 | Lacklison et al. | 350/151 |
| 4,169,189 | 9/1979 | Stacey et al. | 428/539 |
| 4,202,930 | 5/1980 | Kokta et al. | 428/900 |
| 4,265,980 | 5/1981 | Bonner et al. | 428/697 |
| 4,274,935 | 6/1981 | Schmelzer et al. | 204/192 |
| 4,314,894 | 2/1982 | Schmelzer et al. | 204/192 |
| 4,379,853 | 4/1983 | Mateika et al. | 501/135 |
| 4,397,912 | 8/1983 | Ohta et al. | 428/336 |
| 4,414,290 | 11/1983 | Breed et al. | 428/700 |
| 4,433,034 | 2/1984 | Gualtieri et al. | 428/693 |
| 4,435,484 | 3/1984 | Breed et al. | 428/693 |
| 4,454,206 | 6/1984 | Mateika et al. | 428/692 |
| 4,522,473 | 6/1985 | Hibiya et al. | 350/377 |
| 4,532,180 | 7/1985 | Ohta et al. | 252/62.57 |
| 4,539,501 | 9/1985 | Trong et al. | 310/313 A |
| 4,544,239 | 10/1985 | Shone et al. | 252/62.57 |
| 4,556,582 | 12/1985 | Imura et al. | 427/127 |
| 4,556,583 | 12/1985 | Imura et al. | 427/127 |
| 4,568,618 | 2/1986 | Uchishiba et al. | 252/62.57 |
| 4,578,651 | 3/1986 | Heitmann et al. | 350/377 |
| 4,584,237 | 4/1986 | Pulliam | 428/692 |
| 4,625,390 | 12/1986 | Shone et al. | 29/576 B |

OTHER PUBLICATIONS

Tolksdorf et al., "Crystals; Growth, Properties and Applications" Springer-Verlag, N.Y., N.Y. 1978, pp. 80–81.

D. M. Gualtieri et al., "Journal of Applied Physics", Mar. 15, 1984, vol. 55, No. 6, Part IIB, p. 2545.

M. F. Shone et al., "IEEE Transactions on Magnetics" Nov. 1982, vol. MAG-18, No. 6, 1307.

G. L. Nelson et al., "Optical Absorption Reduction in $Bi_1Lu_2Fe_5O_{12}$ Garnet Magneto-Optical Crystals," Mar. 1982, 1687.

*Primary Examiner*—George F. Lesmes
*Assistant Examiner*—William M. Atkinson
*Attorney, Agent, or Firm*—Anibal Jose Cortina; Gerhard H. Fuchs

[57] ABSTRACT

A magneto-optical element comprises a magnetic garnet layer on a crystalline substrate. The garnet layer has a faceted structure, which provides high Faraday rotation and controlled coercivity. The faceted structure is preferably formed by depositing the layer onto a substrate whose lattice constant is sufficiently smaller than that of the layer. The resulting elements find application in light modulators, such as switches and displays, where they permit high resolution without having to be cut into an array of small cells.

8 Claims, 4 Drawing Figures

FACETED MAGNETO-OPTICAL GARNET LAYER AND LIGHT MODULATOR USING THE SAME

CROSS-REFERENCE TO PRIOR APPLICATION

This application is a continuation-in-part of application Ser. No. 627,013, filed July 2, 1984, abandoned.

BACKGROUND OF THE INVENTION

1. Field of the Invention

This invention relates to a magneto-optical layer that provides high Faraday rotation and controlled coercivity.

2. Description of the Prior Art

When certain materials are subjected to a strong magnetic field, they become optically active. Thus, when plane polarized light is sent through such a material in a direction parallel to an applied magnetic field, the plane of polarization is rotated. This magneto-optical effect, called the "Faraday effect," has been observed in many solids, liquids, and gases and has found a variety of applications. In material having a magnetic moment, the amount of rotation of the plane of polarization is proportional to the magnetization and to the distance traveled through the medium. For a typical application, it is desirable that the constant of the proportionality, or "specific Faraday rotation," and transmittance be high.

One application, a magneto-optical light-switching array, dubbed "Lisa," was described by J. Gosch, *Electronics*, Dec. 29, 1981, pp. 53, 54. Potential applications for Lisa-type devices are in printing, electrophotography, and displays.

M. F. Shone et al., IEEE Trans. Magn. *MAG*-18, 1307 (1982), disclosed layers of the form $Bi_xTm_{3-x}Fe_yGa_{5-y}O_{12}$, with $x \geq 0.6$, $y \approx 1.2$. The layers were grown by liquid phase epitaxy on gadolinium gallium garnet (GGG) substrates. These layers show high values of specific Faraday rotation (0.51–0.86 deg/$\mu$m at 632 nm) and a broad range of anisotropy fields (1000–5000 Oe).

Nelson et al., J. Appl. Phys. 53, 1687 (1982), U.S. Pat. No. 4,295,988, issued Oct. 20, 1981, disclosed LPE magneto-optical crystals of $Bi_1Lu_2Fe_5O_{12}$ garnet grown on GGG substrates. They showed that optical absorption of the layers could be reduced by the addition of CaO dopant. The LPE crystal is "constrained to have a similar lattice constant [to the GGG lattice constant]."

Mateika et al., U.S. Pat. No. 4,379,853, issued Apr. 12, 1983, disclosed a magneto-optical device whose substrate composition was chosen primarily to provide a match between the lattice constants of the magneto-optical crystal and substrate.

Bonner et al., U.S. Pat. No. 4,265,980, issued May 5, 1981, disclosed that LPE layers on GGG require that the lattice constant match within about 0.5% and that the substrate surface be smooth and flat, with a high degree of crystalline perfection.

Schmelzer et al., U.S. Pat. Nos. 4,274,935, issued June 23, 1981, and 4,314,894, issued Feb. 9, 1982, disclosed a method of preparing a magnetic layer that includes providing a lattice constant mismatch to cause the LPE layer to be stressed and thereby enhance ion implantation.

Breed et al., U.S. Pat. No. 4,435,484, issued Mar. 6, 1984, disclosed magnetic bubble devices consisting of monocrystalline nonmagnetic substrate bearing a magnetic iron garnet layer. The layer has a stress-induced uniaxial magnetic anisotropy component that results from a difference in lattice parameter between the layer and substrate. The mismatch may be as large as 1%, provided that no stress-relieving defects (cracks, tears, etc.) are generated. A similar disclosure was made earlier by Stacy et al., U.S. Pat. No. 4,169,189, issued Sept. 25, 1979.

Volluet et al., U.S. Pat. No. 4,316,162, issued Feb. 16, 1982, disclosed a magnetostatic wave device on a GGG substrate, in which part of the substrate is roughened to increase the attenuation of the magneto-static wave.

In general, the teaching of the prior art relating to magneto-optical layers emphasizes the desirability of a close match between the lattice constants of the layer and substrate crystals. Where a mismatch between the lattice constants has been disclosed, in each case the device was not magneto-optical.

SUMMARY OF THE INVENTION

In accordance with the present invention, a magneto-optical element is provided comprising a magnetic garnet layer on a crystalline substrate and characterized in that the garnet layer is faceted. The device may be prepared by depositing, by liquid phase epitaxy (LPE), a magnetic garnet layer on a crystalline substrate whose lattice constant is less than that of the garnet layer by an amount sufficient to cause faceting. Depending on the modulus and thickness of the layer, the mismatch should generally be in the range between about 0.5% and 2.0%.

The devices of the present invention have high Faraday rotation and controlled coercivity and find application in magneto-optical light modulators, such as switches, display devices, etc.

DETAILED DESCRIPTION OF THE INVENTION

The present invention provides magneto-optical elements that combine Faraday rotation in excess of 2 deg/$\mu$m and controlled coercivity. They comprise a magnetic garnet layer on a crystalline substrate. In one embodiment, the compositions are chosen so that the lattice constant of the garnet layer exceeds that of the substrate by an amount sufficient to cause faceting. This "lattice mismatch" is defined as $(a_0-a_1)/a_0$, where $a_0$ and $a_1$ are the lattice constants of the garnet layer and substrate, respectively. In other embodiments, faceting of the garnet layer is accomplished by depositing it on a substrate that has been roughened first or, alternatively, by depositing it onto an intermediate layer on the substrate. When the garnet layer is deposited onto an intermediate layer, the compositions are chosen so that the lattice constant of an "upper" layer exceeds that of a "lower" layer, or substrate, by an amount sufficient to cause faceting; i.e., the lattice constant of the garnet layer exceeds that of the intermediate layer or intermediate layer exceeds that of the substrate.

The garnet layers of this invention are grown by liquid phase epitaxy (LPE), described in Blank et al., J. Cryst. Growth 17, 302 (1972). The optimum situation of epitaxial growth is "homoepitaxy," where the substrate and overgrowth are of the same material. The present invention involves heteroepitaxy of a garnet layer on a substrate. In the conventional view, "the most important requirement for successful garnet epitaxy has been the need for lattice parameter match. This has been the best single predictor for success." (L. Varnerin, IEEE Trans. on Magn. *MAG-7*, 404 (1971)) Faceting of an LPE layer has been considered a defect, and identification of parameters to suppress faceting "a major achievement," (ibid.) A key element of facet suppression is good lattice match (to within 1 to 2 pm).

The present invention departs from the conventional view by intentionally having lattice mismatch. As a result of the mismatch, the garnet layer is under a stress. The stress increases linearly with the layer thickness, but only until a "critical stress" is reached. Below the critical stress, the layer is elastically deformed to accommodate the lattice mismatch. When the critical stress is reached, the layer deformation becomes plastic and facets form. Generally, lattice mismatch is at least about 0.5% for faceted films. The value of the critical stress is determined by the elastic properties (i.e., shear modulus, G) of the garnet layer. Although the layer thickness and shear modulus are also involved, it is convenient shorthand to refer to lattice mismatch as the factor that controls faceting.

Figure 1:
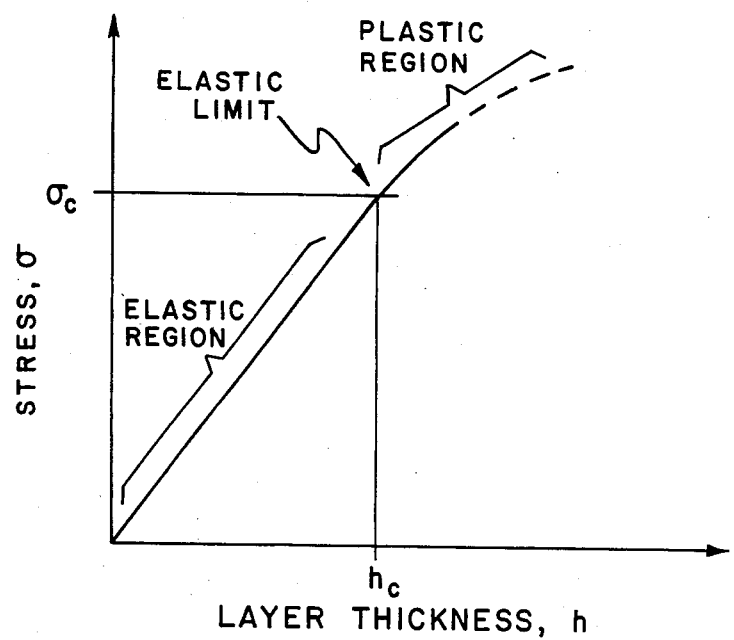
FIG. 1 is a graph of the dependence of stress on layer thickness.
Figure 4:
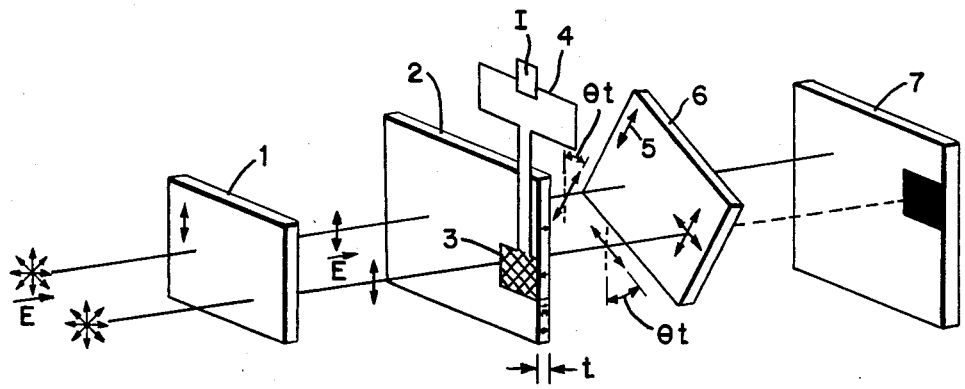
FIG. 4 is a schematic of a light modulator that includes a magneto-optical element of the present invention.

FIG. 1 depicts for a constant lattice mismatch, the linear relationship of stress, $\sigma$, to film thickness, h, in the elastic region and the non-linear relationship that applies in the plastic region, where facets have developed. In a perfect crystal, the critical stress, above which faceting takes place, is $G/2\pi$; in real crystals, it may be as low as $G/100$. For typical garnet layers, the critical stress is $\sim 10^{10}$ dynes/cm$^2$ and the critical thickness about 100 nm. The relationship between mismatch and critical thickness was discussed by Trong et al., U.S. Pat. No. 4,539,501, issued Sept. 3, 1985.

Under controlled conditions, the crystal morphology of an LPE magneto-optical garnet layer changes from a continuous, low-defect structure to a highly defective facet structure. If it contains bismuth, this faceted layer has a significantly higher Faraday rotation than a continuous layer grown from the same melt, because the concentration of bismuth dopant in the layer is believed to increase significantly. For example, electron microprobe analysis showed about a 2-fold increase in bismuth concentration in layers as faceting sets in. The Faraday rotation of such layers, which is nearly proportional to bismuth content, is likewise doubled by faceting. In such melts, the lattice constant of the layers generally increases as growth temperature is decreased. Since the LPE layer has a greater lattice constant than the substrate, facets develop for certain melt compositions when the growth temperature is below a critical value. If lattice mismatch is too great, epitaxial growth is prevented. Thus, the LPE layer lattice constant preferably exceeds that of the substrate by less than about 2%.

Layer composition is determined by a combination of the melt composition and growth temperature. The preferred layer compositions are transition metal garnets, more preferably iron garnets. In a preferred device, the garnet layer is a composition nominally represented by the formula $R_{3-d}(Ca, Sr)_d(Fe, Ni, Co, Ga)_{5-d}(Si, Ge)_dO_{12}$ where R is at least 1 element of the group consisting of Bi, Y, and the elements having atomic number from 57 to 71, and d is from 0 to about 1.5. More preferred is $(Bi, Y, Tm, Gd)_3(Fe, Ga)_5O_{12}$. The preferred substrate is gadolinium gallium garnet (GGG). When the LPE layer is deposited on a GGG substrate, deposition on the (111) face is preferred.

A primary application of magneto-optical elements is in switches/displays or other light modulators. If a beam of plane polarized light is incident on an element having a magnetic easy axis normal to its surface, the plane of polarization is rotated, clockwise or counter clockwise, depending on the direction of magnetization of the layer. If the rotated beam is then passed to a suitably-oriented analyzer, transmission through the analyzer will depend on the orientation of the plane of polarization of the beam. Thus, by changing the direction of the magnetization, the beam can be turned "on" and "off." The maximum on-off contrast is achieved if the device rotates the plane of polarization by 45°, creating a 90° difference in plane of polarization depending on the direction of magnetization. (*Electronics*, Dec. 29, 1981, p. 53; and Mar. 24, 1983, p. 51.) In general, the present invention provides a light modulator that comprises a magneto-optical element, described above, adapted for placement so that a beam of polarized light is incident on, and passes through, the garnet layer; an analyzer adapted for placement so that the beam, after passing through the element, is incident on the analyzer; means for applying a magnetic field to the garnet layer; and means for adjusting the magnetic field to control the light transmitted by the light modulator. The magnetization may be switched thermally (Lisa device of Philips) or electrically (Light Mod device of Litton), with effective optical switching times of less than a microsecond. A comprehensive discussion of the Lisa and Light Mod devices, among others, appeared in P. Paroli, Thin Solid Layers 114, 187 (1984).

Below saturation, the degree of polarization rotation depends on the applied field strength, layer thickness, Faraday rotation constant, and saturation magnetization of the layer. The devices described above require a transparent layer. Other things being equal, a high Faraday rotation constant is desirable, because it permits a thinner and, therefore, more transparent layer to be used. Alternatively, high transmission is desirable, because it permits a thicker layer to be used, which will provide greater rotation of the plane of polarization. Thus, a magneto-optical figure of merit can be defined for a material by $\theta/\alpha$, where $\theta$ is the specific Faraday rotation and $\alpha$ the absorption. (See G. B. Scott et al., IEEE Trans. on Magn. *MAG*-12, 292 (1976).) Figures of merit as a function of incident wavelength for various garnet materials were reported by Hansen et al., Landolt-Bornstein, Group III, Vol. 12, "Magnetic and Other Properties of Oxides and Related Compounds," part a "Garnets and Perovskites," SpringerVerlag, N.Y., 1978, p. 196.

A common characteristic of the magneto-optical compositions discussed above is that they have little or no coercivity. As a result, the materials lose their net magnetization in the absence of an applied field. To avoid having to maintain an applied field, the devices prepared from these compositions are divided into cells. Each cell comprises a single domain that retains its magnetization in zero applied field. In contrast to this, the present devices have non-zero coercivity, which provides several advantages. First, there is no need to divide the layer into domain-sized cells. Secondly, the magnetization of the present layer can be continuously varied by an applied field to provide a range of values of transmitted light. The small cells of earlier magneto-optical devices are 2-level, having a fixed magnetization, with only the direction variable. Finally, the parameters of the small cells are sensitive to crystal defects, while the present layers have a high dislocation density and are thus less sensitive to crystal defects.

FIG. 1 shows the optical absorption hysteresis of a faceted magneto-optical layer placed between polarizer and analyzer plates oriented so that the relative light intensity transmitted by the analyzer tracks the magnetization of the layer. Thus, the layer shows a typical "B-H loop" hysteresis in response to an applied magnetic field. In practice, the layer is first 100% saturated, and the polarizer and analyzer then oriented to provide minimum light transmittance. Saturation is achieved when a field of about 300 Oe is applied, and the layer maintains this saturated state when the field is removed. Application of a field of about 300 Oe in the opposite direction brings the layer to saturation in the opposite direction (maximum light transmittance), which also remains when the field is removed. The applied field, $H_s$, necessary for switching between 0 and 100% relative transmittance (in this case, 300 Oe) is somewhat greater than the coercivity, Hc, which is the applied field at which the magnetization is zero (50% transmittance).

Figure 2:
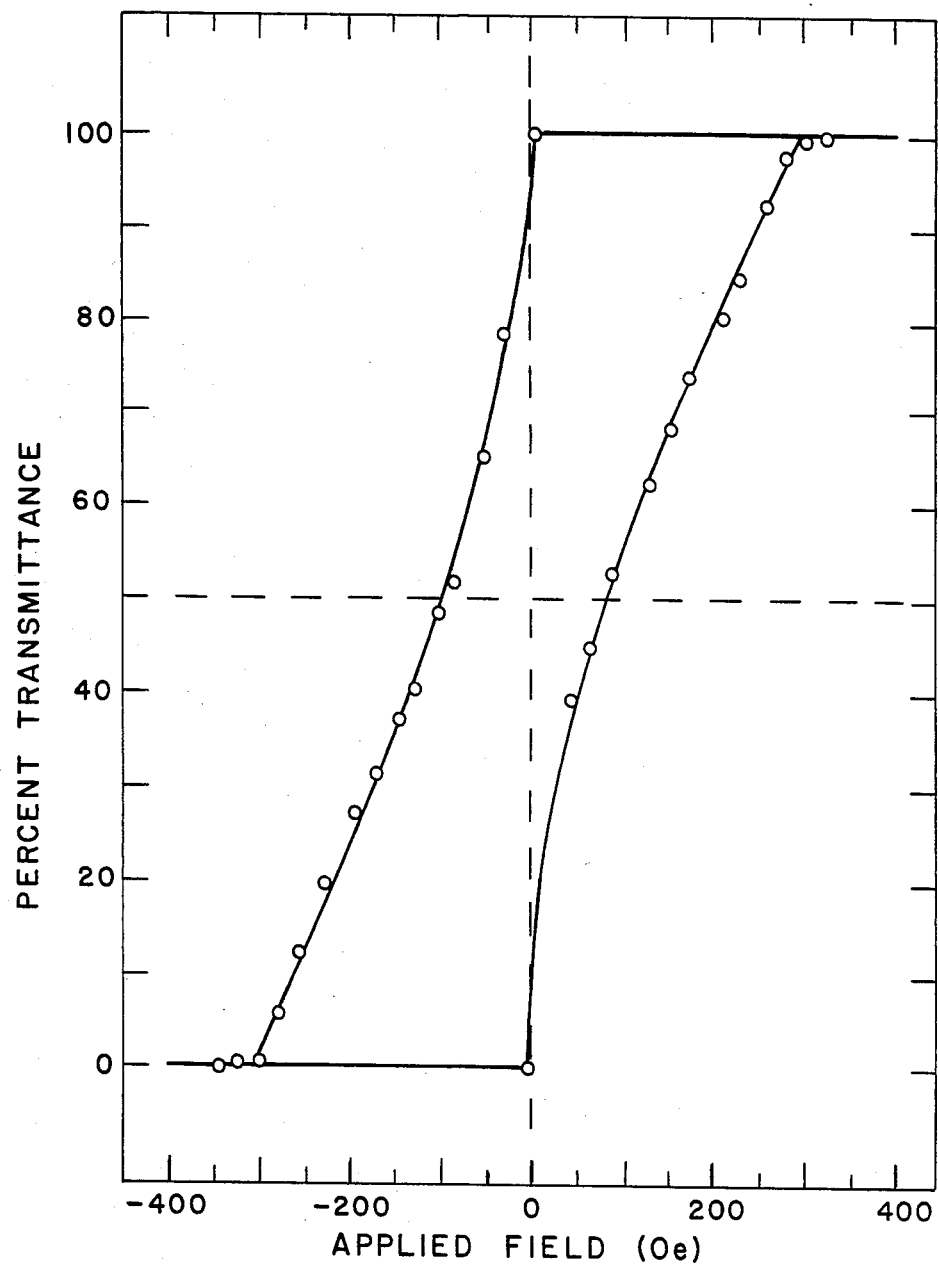
FIG. 2 depicts the dependence of transmittance on applied field for a display based on the magneto-optical element of this invention.

FIG. 2 shows the dependence of switching field on layer thickness and, composition. As is shown there, switching field generally decreases with increasing layer thickness. The compositional dependence is not quite as simple. $R_2$ has been defined as the ratio of transition metal atoms (in this case iron) to non-magnetic atoms (in this case gallium) in the melt from which the faceted magneto-optical layers are grown. Decreasing $R_2$ reflects increased substitution of Ga for Fe in the layer composition. Over the range of $R_2$ values plotted in FIG. 2, switching field increases with increasing Ga substitution, which corresponds to decreasing saturation magnetization. However, a minimum saturation magnetization is achieved when the net spin of the transition metal atoms is a minimum (or 0). Additional substitution causes an increase in saturation magnetization. (As was discussed earlier, layer composition depends on both melt composition and temperature.) By adjusting layer composition and thickness, a range of desirable switching field values can be achieved.

Although the preferred method for preparing the present layers is to deposit them on a substrate having the appropriate smaller lattice constant, other suitable methods have been found. One method involves first roughening the substrate surface. Layers deposited on an appropriately roughened surface develop the highly defective facet structure that characterizes the layers of the present invention. Roughening can be accomplished in various ways, well known in the art. For example, polishing with a 1-μm grit has been found suitable.

In another method, a crystalline intermediate layer is first deposited onto the substrate; the garnet layer is then deposited onto the intermediate layer. The garnet layer has a lattice constant that exceeds that of the intermediate layer (or the intermediate layer exceeds that of the substrate) by an amount sufficient to cause faceting in the overgrowth layer.

Figure 3:
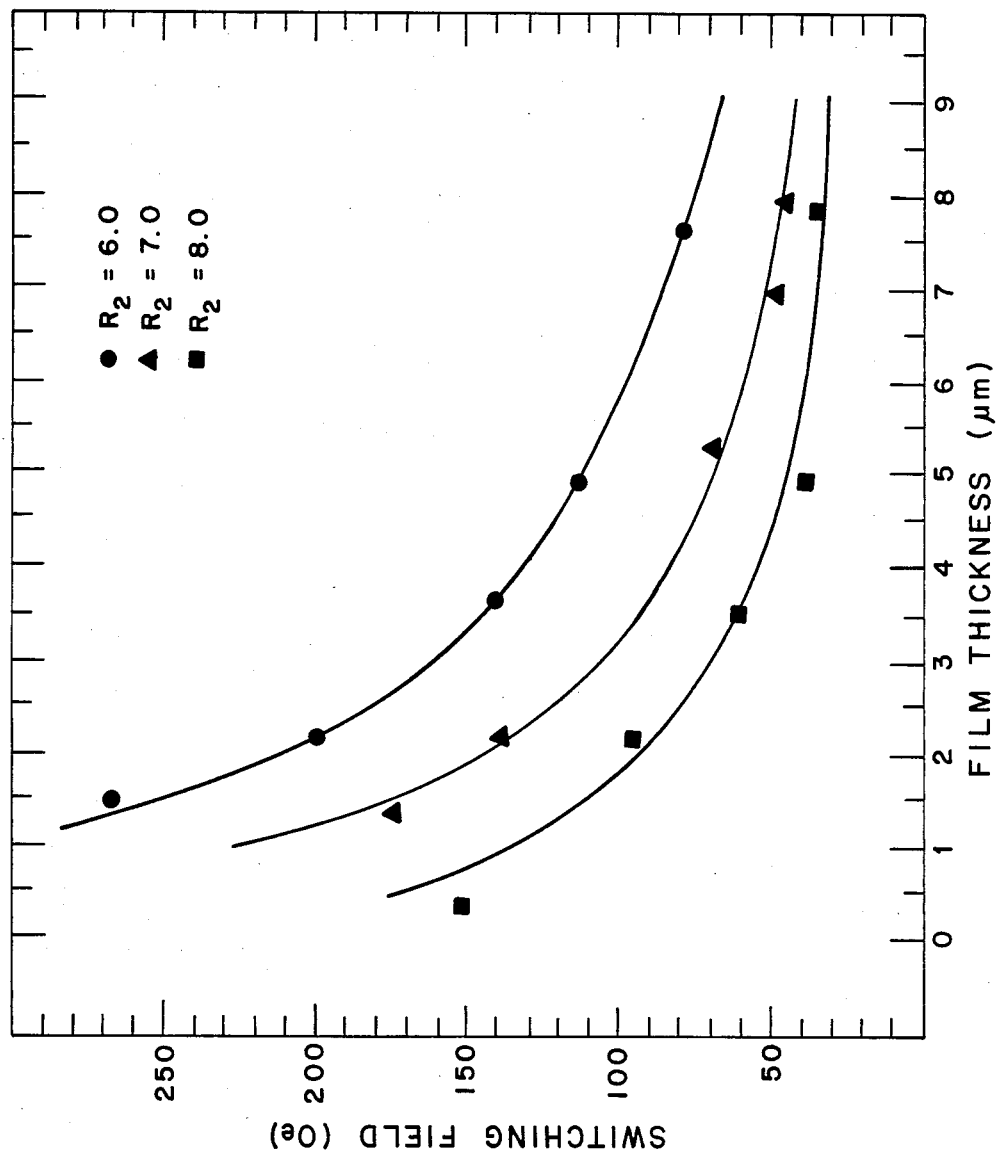
FIG. 3 shows the dependence of switching field on layer thickness for three compositions.

FIG. 3 depicts a light modulator of the present invention. Polarized light, for example from a source of unpolarized light and a polarizer 1, passes through magneto-optical element 2 of thickness t. (For simplicity, the substrate is not shown). The magnetization in the cross-hatched area inside a loop 3, having a desired shape, has been switched antiparallel to the magnetization in the rest of the element by passing a current pulse through the loop from current source 4. Because of the coercivity of the element, the magnetization remains switched after the current pulse is removed. The electric field vector E of the polarized light passing through the cross-hatched area is rotated through an angle $\theta t$ because of the Faraday effect. For the light transmitted through the area outside the loop, E is rotated through an angle $-\theta t$. The polarizing axis 5 of analyzer 6 is oriented 90° from the direction of the E vector of the light that has passed through the cross-hatched area. Thus, this light is blocked, and a corresponding area of screen 7 is dark. However, the E vector of the light transmitted through the area of the element outside the loop is at an angle $90° - 2\theta t$ from the analyzer axis. This light, whose intensity is a maximum when $\theta t = 45°$, reaches the screen and produces a light background.

The following examples are presented in order to provide a more complete understanding of the invention. The specific techniques, conditions, materials, and reported data set forth to illustrate the principles and practice of the invention are exemplary and should not be construed as limiting the scope of the invention.

EXAMPLE 1

A layer of composition (Bi, Y, Tm, Gd)$_3$(Fe, Ga)$_5$O$_{12}$ was grown on a (111)-oriented substrate of Gd$_3$Ga$_5$O$_{12}$ from the following melt:
  $R_1 = Fe_2O_3/RE_2O_3 = 35$
  $R_2 = Fe_2O_3/Ga_2O_3 = 7$
  $R_4$ = solute concentration = 0.16
  $PbO/2Bi_2O_3 = 2.1$
  $PbO/2B_2O_3 = 11.7$
  $Y_2O_3/RE_2O_3 = 0.25$
  $Tm_2O_3/RE_2O_3 = 0.55$
  $Gd_2O_3/RE_2O_3 = 0.20$ The "R" parameters are those defined in S. L. Blank et al., IEEE Trans. Magn. MAG-13, 1095 (1977), with PbO, B$_2$O$_3$, and Bi$_2$O$_3$ constituting the flux, and RE$_2$O$_3$ designating the sum of the yttrium and rare-earth additions. The layer was grown at 735° C. for five minutes at a unidirectional rotation rate of 200 rev/min. This resulted in a layer of 3.25 μm thickness, a Curie temperature $T_c$ of 201.8° C., a lattice constant of 1.2456 nm (as measured normal to the layer surface), and a specific Faraday rotation $\theta$ of 3.53 deg/μm, as measured at 546.1 nm.

EXAMPLES 2-17

Layers similar to that described in EXAMPLE 1 were grown to investigate thickness and composition effects. The melt composition was the same, except that $R_2$ was varied from 6 to 8, and the PbO/2Bi$_2$O$_2$ ratio was 2.5. A growth temperature of about 720° C. was used, which gave a growth rate of about 0.4 μm/min, and the growth time was varied to obtain desired thicknesses. The Table summarizes the layer properties, including the switching field data that appear in FIG. 2.

TABLE

| Example | $R_2$ | Thickness (μm) | $H_s$ (Oe) | $T_C$ (K) | Lattice Constant a (nm) | θ at 546.1 nm (deg/μm) |
|---|---|---|---|---|---|---|
| 2 | 6.0 | 1.44 | 267 | 455.0 | 1.24500 | 2.72 |
| 3 | 6.0 | 2.14 | 200 | 454.7 | 1.24492 | 2.80 |
| 4 | 6.0 | 3.67 | 141 | 454.1 | 1.24503 | 3.02 |
| 5 | 6.0 | 4.89 | 114 | 452.6 | 1.24503 | 2.93 |
| 6 | 6.0 | 7.67 | 81 | 455.2 | 1.24523 | 3.09 |
| 7 | 6.5 | 7.30 | 60 | 461.8 | 1.24543 | 3.14 |
| 8 | 7.0 | 1.36 | 176 | 469.2 | (1.24500)* | 2.80 |
| 9 | 7.0 | 2.18 | 140 | 469.6 | 1.24504 | 3.06 |
| 10 | 7.0 | 5.32 | 70 | 466.8 | 1.24476 | 2.80 |
| 11 | 7.0 | 7.01 | 50 | 469.7 | 1.24522 | 3.30 |
| 12 | 7.0 | 7.95 | 48 | 469.1 | 1.24539 | 3.27 |
| 13 | 8.0 | 1.35 | 153 | 483.8 | 1.24511 | 3.13 |
| 14 | 8.0 | 2.14 | 96 | 483.2 | 1.24507 | 3.25 |
| 15 | 8.0 | 3.55 | 60 | 483.7 | 1.24525 | 3.42 |
| 16 | 8.0 | 4.95 | 40 | 480.7 | 1.24565 | 3.38 |
| 17 | 8.0 | 7.88 | 36 | 483.5 | 1.24522 | 3.43 |

*Estimated.

We claim:

1. A magneto-optical element comprising a magnetic garnet layer on a crystalline substrate, characterized in that the lattice constant of said garnet layer exceeds the lattice constant of the substrate by a least about 0.5%, and wherein the thickness of said garnet layer is such that the lattice constant mismatch is effective to produce stress between the substrate and said garnet layer that exceeds the critical stress whereby stress no longer increases linearly with said garnet layer thickness and garnet layer deformation becoming plastic with facets forming.

2. The element of claim 1 in which the garnet layer has a composition nominally represented by the formula $R_{3-d}(Ca, Sr)_d(Fe, Ni, Co, Ga)_{5-d}(Si, Ge)_d O_{12}$, where R is at least 1 element of the group consisting of Bi, Y, and the elements having atomic number from 57–71, and d is from 0 to about 1.5.

3. The element of claim 2 in which the garnet is $(Bi, Y, Tm, Gd)_3(Fe, Ga)_5 O_{12}$.

4. The element of claim 1 in which the substrate is GGG.

5. The element of claim 4 in which the garnet layer is on the (111) face of GGG.

6. The element of claim 1 in which the lattice constant of the garnet layer exceeds the lattice constant of the substrate by less than about 2%.

7. A light modulator comprising
   The magneto-optical element of claim 1 placed so that a beam of polarized light is incident on, and passes through, the layer,
   an analyzer placed so that the beam, after passing through the element, is incident on the analyzer,
   means for applying a magnetic field to the layer, and
   means for adjusting the magnetic field to control the light transmitted by the light modulator.

8. A process for preparing a magneto-optical element comprising depositing by liquid phase epitaxy a magnetic garnet on a crystalline substrate characterized in that the lattice constant of said garnet layer exceeds the lattice constant of the substrate by at least about 0.5%, and the deposition being conducted to a thickness of said garnet layer such that the lattice constant mismatch is effective to produce stress between the substrate and said garnet layer that exceeds the critical stress whereby stress no longer increases linearly with said garnet layer thickness and garnet layer deformation becoming plastic with facets forming.

* * * * *